United States Patent [19]

Ueda et al.

[11] Patent Number: 4,849,265
[45] Date of Patent: Jul. 18, 1989

[54] SHEET COATED WITH BEADS AND PROCESS FOR PREPARING SAME

[75] Inventors: Minoru Ueda, Osaka; Hiroshi Kimoto, Kyoto, both of Japan

[73] Assignee: The Ohtsu Tire & Rubber Co., Ltd., Osaka, Japan

[21] Appl. No.: 193,581

[22] Filed: May 13, 1988

[30] Foreign Application Priority Data

Sep. 3, 1987 [JP] Japan .................................. 62-221720

[51] Int. Cl.$^4$ ............................ B32B 3/16; B32B 3/18
[52] U.S. Cl. ...................................... 428/40; 428/145; 428/147; 428/149; 428/142
[58] Field of Search ............... 428/142, 144, 145, 149, 428/143, 141, 40, 147

[56] References Cited

U.S. PATENT DOCUMENTS 3,405,025 10/1968 Goldman .............................. 428/142
3,764,455 10/1973 Lovell et al. ......................... 428/149

FOREIGN PATENT DOCUMENTS 59-15068 4/1984 Japan .
61-36998 10/1986 Japan .

Primary Examiner—Alexander S. Thomas
Attorney, Agent, or Firm—Sixbey, Friedman, Leedom & Ferguson

[57] ABSTRACT

A sheet coated with beads and comprising a flexible sheet substrate and a transparent bead layer formed on the surface of the substrate integrally therewith, with an adhesive layer provided therebetween. Another bead-coated sheet comprises an elastic flexible sheet substrate, a hard transparent bead layer formed over the surface of the substrate with an adhesive layer interposed therebetween, a transparent cover coat layer integrally formed on the bead layer and a transparent top coat layer integrally formed on the cover coat layer and having lower hardness than the beads. The coat layers permit the bead layer to retain surface projections provided by the beads.

17 Claims, 3 Drawing Sheets

SHEET COATED WITH BEADS AND PROCESS FOR PREPARING SAME

FIELD OF THE INVENTION AND RELATED ART STATEMENT

The present invention relates to sheets which are coated with beads and to a process for preparing the same.

It is known to coat the surface of a panel with glass beads with an adhesive to give the surface improved resistance to weather, water, abrasion, etc., to impart an ornamental effect to the surface or to prevent hallucinations due to the light reflected from the surface (see Examined Japanese Utility Model Publication No. SHO 61-36998). The color, pattern and the like on the bead-coated panel surface appear beautiful in a unique fashion to the viewer when reflected and refracted at the glass beads to achieve an excellent ornamental effect.

Furthermore, reflective films or sheets prepared by embedding highly reflective fine glass beads in a synthetic resin are used for various traffic signs, guide signs, etc. (see, for example, Examined Japanese Patent Publication No. SHO 59-15068).

The former coated panel is prepared by directly coating the panel substrate with beads and therefore requires equipment therefore and a complex procedure.

The latter has embedded in a synthetic resin, glass beads which are not transparent, so that the reflective film or sheet, even if affixed to the surface of a panel, fails to give a satisfactory ornamental effect to the panel surface.

OBJECT AND SUMMARY OF THE INVENTION

The main object of the present invention, which has been accomplished in view of the foregoing problems, is to provide a bead-coated sheet which readily imparts an ornamental effect and durability to panel surfaces and which is easy to handle, and also a suitable process for preparing the sheet.

To fulfill the above object, the invention provides a sheet coated with beads which comprises a flexible sheet substrate and a transparent bead layer initially formed on the surface of the substrate with an adhesive layer provided therebetween. The sheet is cut to a suitable size and immediately affixed to a desired panel, consequently beautifying the panel surface with an improved ornamental effect and giving the surface improved durability in respect of resistance to weather, water, abrasion, corrosion and the like. The coated sheet can be rolled up for easy transport and can be affixed to panels with ease without necessitating any skill.

The present invention provides another sheet coated with beads which comprises an elastic flexible sheet substrate, a hard transparent bead layer formed over the surface of the substrate with an adhesive layer interposed therebetween, a transparent cover coat layer integrally formed on the bead layer and a transparent top coat layer integrally formed on the cover coat layer and having lower hardness than the bead layer, the coat layers permitting the bead layer to retain surface projections provided by the beads. The bead-coated sheet has an excellent decorative or ornamental effect, is less likely to permit rigid articles placed thereon to slip and gives off no disagreeable contact noise. The flexible sheet substrate, which is elastic, produces suitable noise attenuating and damping effects when articles are placed on the coated sheet.

The present invention further provides a production process comprising forming a transparent bead layer on a transparent hot-melt adhesive layer in a sunken state to form a bead-adhesive layer, and press-bonding the bead-adhesive layer to a flexible sheet substrate, such as a fabric or leather, having a fibrous structure with heating after superposing the bead-adhesive layer on the substrate. The bead-coated sheet obtained is therefore free of the problem of impaired hand that would be encountered when a liquid adhesive is applied to a fabric or the like, so that the sheet obtained can be washed with water. When a pattern or the like is printed on the surface of the flexible sheet substrate, the overlying transparent bead layer reflects and refracts light, allowing the coated sheet to exhibit a very beautiful appearance.

DESCRIPTION OF THE PREFERRED EMBODIMENTS

Figure 1:
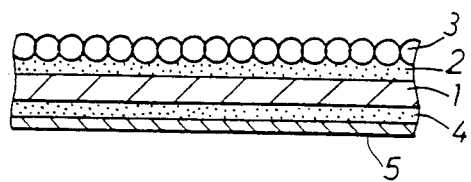
FIG. 1 is a fragmentary diagram in section showing an embodiment of bead-coated sheet of first type according to the invention.
Figure 2:
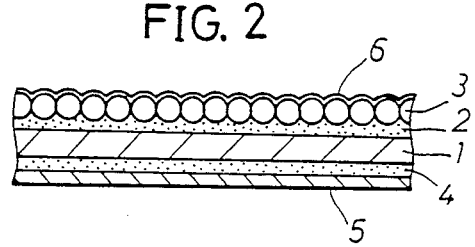
FIG. 2 is a similar view showing another embodiment of bead-coated sheet of the first type.

Bead-coated sheets of the first type embodying the invention will be describe first with reference to FIGS. 1 and 2.

Referring to FIG. 1, a transparent bead layer 3 is integrally formed on a flexible sheet substrate 1 with an adhesive layer 2. A pressure-sensitive adhesive layer 4 is formed over the rear side of the substrate 1 and is covered with release paper 5 affixed to the layer 4.

The sheet shown in FIG. 2 further has a transparent cover coat layer 6 formed over the surface of the bead layer 3.

The flexible sheet substrate 1 to be used in the present invention is 20 to 3000 micrometers, preferably 100 to 2000 micrometers, in thickness, has resistance to water, weather, corrosion and the like, and bears a print of pattern or is colored as desired. When required, the substrate is one pretreated for adhesion. The sheet substrate is usually made of polyvinyl chloride, polyethylene, polypropylene, polyester, acrylic, polycarbonate or like synthetic resin. Examples of other useful substrates are fabrics or nonwoven fabrics which are knitted, woven or otherwise formed of natural, chemical or synthetic fiber, such as cotton, hemp, rayon, nylon, polyester, acrylic or the like, leathers, synthetic or natural papers, metal foil, etc. One of these substrates is selected for use. The polyvinyl chloride sheet is especially suitable since it is inexpensive, easily adjustable in flexibility by varying the plasticizer content and highly amenable to printing or coloring.

The adhesive to be used for the adhesive layer 2 is urethane, acrylic, epoxy, fluorine-containing, silicone or like adhesive which is flexible, transparent and resistant to water, weather, corrosion and the like. Preferably, the adhesive is low in shrinkability and curable at low temperatures. Especially suitable are resins of aqueous emulsion type, such as shrinkage-free epoxy resin, vinyl acetate and acrylic acid esters. The use of these resin adhesives almost eliminates the shrinkage of the flexible sheet substrate 1, assures greatly improved adhesion of beads to preclude the beads from dislodgement and gives an improved surface finish to the coated sheet. Since these resin adhesives are free from any organic solvent, no organic solvent will migrate into the inexpensive polyvinyl chloride sheet used as the substrate 1. The substrate therefore remains free of swelling, giving an inexpensive coated sheet of high quality.

The adhesive layer 2 is formed by applying the adhesive to the surface of the substrate sheet 1 by suitable means, such as a roll coater or spray, to such a uniform thickness that the beads will not be embedded in the adhesive layer, according to the size of beads. If the beads are completely embedded in the adhesive layer 2, the beads will not function as contemplated or produce an ornamental effect owing to their size and transparency. Accordingly, the thickness of the adhesive layer 2 is usually up to one-half of the size of beads.

The aqueous emulsion type resin for forming the adhesive layer can be diluted with water and is therefore applicable with great ease. This leads to a reduced production cost through diminished production losses and improved work efficiency.

The cover coat layer 6 covering the surface of the bead layer 3 is prepared from the same material as the adhesive for the adhesive layer 2. The cover coat layer 6 has a suitable thickness (preferably up to 500 micrometers) so as not to eliminate the surface irregularities of the bead layer 3.

Depending on the type of flexible sheet substrate, synthetic resins curable with ultraviolet rays are usable for forming the adhesive layer 2 and the cover coat layer 6.

For forming the bead layer 3, it is desirable to use beads which are transparent, have resistance to weather and water and are pretreated (for example with a silane coupling agent) for adhesion. Also usable are those having abrasion resistance. Examples of useful materials are glass, hard or soft plastics, etc. Examples of useful silane coupling agents are aminosilane, glyoxide silane, acrylsilane and the like, among which acrylsilane is suitable. The beads to be used are about 30 to about 5000 micrometers, preferably 100 to 1000 micrometers, in size.

The bead layer 3 is formed by uniformly applying beads to the adhesive layer formed over the flexible sheet substrate 1 and still in an uncured state, lodging the beads by applying a suitable pressure and thereafter curing the adhesive layer by drying.

The adhesive layer 2 is cured at a low temperature or an elevated temperature as desired, or projecting ultraviolet rays (inclusive of electron rays) on the layer. An infrared heater, electric oven or the like is usable for curing at an elevated temperature. When the substrate is, for example, a soft polyvinyl chloride sheet which greatly shrinks when heated, the temperature is controlled by cooling with water or air as required, or a low-temperature curable resin is used for curing at room temperature or at a temperature of up to 80° C.

The cover coat layer 6 is formed by applying a cover coat material to the bead layer 3 by suitable means as by coating or spraying after the adhesive layer 2 has been cured, and curing the resulting coating in the same manner as already stated.

The bead-coated sheet of the present embodiment is used by removing the release paper 5 and adhering the sheet to the surface of a panel of plastics, metal, glass, concrete or the like with the layer 4 of rubber, ester or like pressure-sensitive adhesive.

According to the present invention, the adhesive layer 4 and the release paper 5 need not always be provided, but the coated sheet may be bonded to the panel surface using a suitable adhesive. The present sheet is usable for various purposes as will be described below.

Chiefly to produce an ornamental effect and additionally to preclude hallucinations and to utilize the reflecting properties, the bead-coated sheet of the first type of the invention can be used as interior materials for wall paper and sliding doors, for accessories, emblems or stickers, as exterior or interior finishing materials for trucks, buses and other motor vehicles, for illumination device hoods and illuminated signboards, etc.

Chiefly to inhibit corrosion and additionally to utilize resistance to seawater and ornamental effect, the sheet is also usable for outfits for ships, signboards to be installed along coasts, etc.

Chiefly to give lightfastness and additionally to obtain a decorative effect, the sheet is usable for pillboards or signboards, guide signs, etc.

Chiefly to obtain an anti-skid effect and additionally to give an ornamental effect and to assure safety, the sheet is usable as an anti-skid material for steps, as a floor material for bathrooms, toilets and pools, and for table cloth.

Chiefly to give resistance to water, moisture and staining and additionally to impart an ornamental effect, the sheet is usable as wall covering material for bathrooms and kitchens.

Chiefly to give resistance to condensation and additionally to obtain resistance to water, reflective effect and ornamental effect, the sheet is usable for guide signs, traffic signs, etc. in cold climate.

The sheet is usable also for preventing adhesion of posters or stickers to utility poles and telephone poles.

Chiefly to assure diffusion of heat and additionally to reflect light and produce an ornamental effect, the sheet is usable for beach umbrellas, tents, curtains, sun visors, caps, helmets, etc.

The sheet is usable as an insulation for various devices.

Bead-coated sheets of the second type according to the invention will be described next.

Although the coated sheet of the first type has an outstanding ornamental effect, the sheet has a reduced area of contact with rigid articles placed thereon, rendering the article liable to skid. The sheet also has the drawback of giving off a great noise, for example, when a glass or the like is placed thereon.

The bead-coated sheet of the second type embodying the invention has an ornamental effect and is free of the above drawback. Embodiments of this type will be described with reference to FIGS. 3 and 4.

Figure 3:
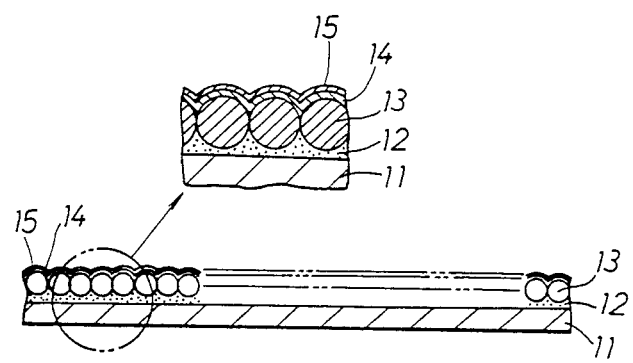
FIGS. 3 and 4 are fragmentary diagrams in section showing different embodiments of bead-coated sheet of second type according to the invention.

With reference to FIG. 3, a hard transparent bead layer 13 is bonded to the surface of an elastic flexible sheet substrate 11 with an adhesive layer 12. A transparent cover coat layer 14 is formed over the surface of the bead layer 13 so as not to eliminate the surface irregularities provided by the beads. A transparent top coat layer 14 having lower hardness than the beads is similarly formed over the surface of the cover coat layer 14 for the same purpose as the layer 14.

Figure 4:
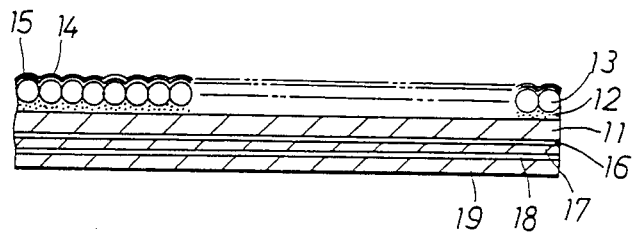

The sheet shown in FIG. 4 comprises the sheet of FIG. 3 wherein the flexible substrate 11 is in the form of a transparent sheet having a pattern printed thereon. A reflective layer 17, such as a metal-deposited film, is affixed to the rear side of the substrate 11 with an adhesive layer 16 and is further covered with release paper 19 affixed to the rear side of the layer 17 with a pressure-sensitive adhesive layer 18.

The substrate 11 for use in the second type has resistance to water, weather, corrosion and the like, bears a print of pattern or is colored as desired as is the case with FIG. 4, and is pretreated for adhesion when so required. The substrate is made of a highly damping elastic rubber (preferably at least 0.15 in tan δ value), rubber sponge, urethane sponge or like foam, thick fabric or nonwoven fabric knitted, woven or otherwise formed of natural, chemical or synthetic fiber such as cotton, hemp, rayon, nylon, polyester, acrylic or like fiber, leather, or the like.

The adhesive layer 12 and the cover coat layer 16 are similar to those of the bead-coated sheet of the first type in material, thickness and method of formation.

The transparent bead layer 13 is made of beads of a hard material such as glass, hard plastics or the like but is the same as the like layer in the first sheet in respect of bead size and method of adhesion.

The top coat layer 15 to be formed over the cover coat layer 16 is made of a transparent material which is 10 to 50, preferably 15 to 40, in hardness according to JIS A, such as elastic silicone resin, soft polyurethane resin or soft epoxy resin. The cover coat layer 14 can be prepared from the same material as the top coat layer 15.

The top coat layer 15 is formed by applying the material to the cover coat layer by coating or spraying with suitable means and drying the coating by the same means as mentioned above.

When the flexible sheet substrate 11 is thick and relatively stiff, the bead-coated sheet of the second type is used as cut to a suitable shape as a coaster, table mat, table cloth, carpet, counter top, telephone mat and the like. When the substrate 11 is thin and highly flexible, the sheet is usable as affixed to a backing.

When a flexible sheet substrate having a fibrous structure, such as fabric or leather, is to be coated with beads, a liquid adhesive containing a solvent is usually used for forming an adhesive layer. The liquid adhesive then penetrates into the substrate to result in impaired hand. To obviate this drawback, it appears useful to affix a bead-coated film lined with a pressure-sensitive adhesive to the sheet substrate, but the adhesive lining has poor adhesion to the fabric or the like, and the coated sheet is not washable with water. Moreover, the rigidity of the film and the adhesive is likely to diminish the hand of the sheet substrate.

The present invention provides a production process which is free of this problem. The process will be described below with reference to FIGS. 5 to 11.

Figure 5:
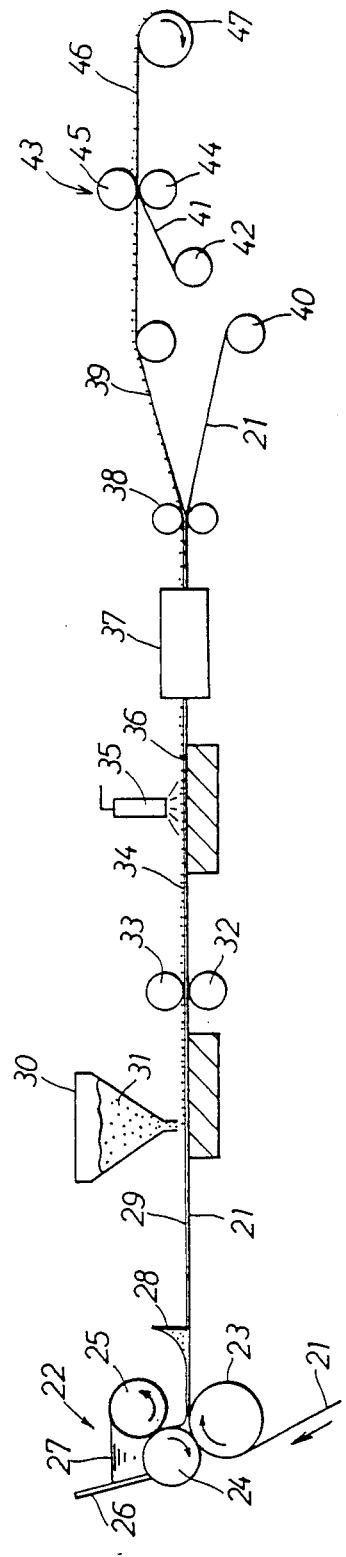
FIG. 5 is a diagram illustrating a production process embodying the invention.
Figure 6:
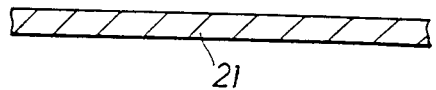
FIGS. 6 to 11 are diagrams in section showing a release sheet to product sheet in different steps of the process.
Figure 7:
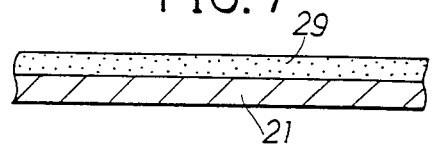

FIG. 5 is a diagram illustrating the production process of the invention. Indicated at 21 is a release sheet, and at 22 is an adhesive applicator for practicing, for example, the reverse roll coating method. The applicator 22 comprises a backing roll 23, a casting roll 24, a metering roll 25 and a tank 26 containing a melt of hot-melt adhesive 27. The applicator 22 applies the melt to the release sheet 21 to a suitable uniform thickness, and an excess of melt is removed by a doctor blade 28. A hot-melt adhesive layer 29 is formed by this step on the surface of the release sheet 21 of FIG. 6 as seen in FIG. 7.

Figure 8:
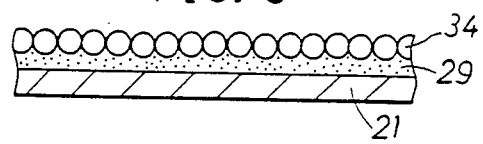

While the molten adhesive layer 29 still retains a high viscosity before solidifying through cooling, a transparent bead material contained in a hopper 30 is sprinkled over the surface of the layer 29. Subsequently, the bead material applied is lightly pressed by a heat roll 32 and a pressure roll 33 in a pair. This step forms a bead layer 34 having a uniformly flat outer surface and firmly bonded to the adhesive layer 29 with the beads partly sunken in the layer 29 as seen in FIG. 8.

Figure 9:
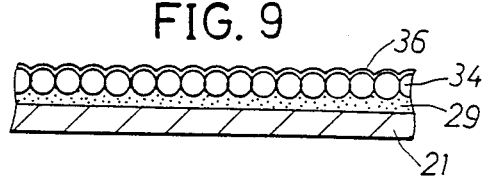

Indicated at 35 is a sprayer as an example of means for coating the bead layer 34 with a transparent cover coating agent. The cover coating agent is applied by the sprayer 35 to the surface of the bead layer 34 to form a cover coat layer 36 as shown in FIG. 9.

Figure 10:
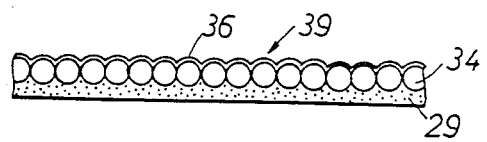

Indicated at 37 is a drying unit in which the adhesive layer and the cover coat layer are cured at a low temperature or elevated temperature as desired, or by being exposed to ultraviolet rays (inclusive of electron rays). The resulting sheet is passed through the nip of pinch rollers 38, whereupon the release sheet 21 is separated off, giving a bead-adhesive sheet 39 as seen in FIG. 10. The release sheet 21 is wound up by a take-up unit 40 for reuse.

Figure 11:
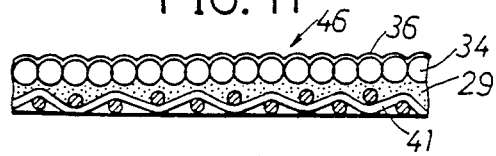

A flexible sheet substrate 41, such as a fabric or leather, is paid off from a supply unit 42 and then superposed on the rear side of the bead-adhesive sheet 39. The assembly is subjected to heat and pressure by a heating-pressing unit 43 with a heat roll 44 and a rubber roll 45, whereby the hot-melt adhesive in the sheet 39 is softened and partly melted to impregnate the fibrous structure of the flexible sheet substrate 41, bonding the sheet 39 to the substrate 41. The assembly is then cooled and dried to give a bead-coated sheet 46 of the first type which includes a fabric or the like as the substrate as seen in FIG. 11. The sheet 46 is wound up by a take-up unit 47.

Although a preferred mode of practicing the present process has been described above, the adhesive need not always be applied by the applicator 22 in the manner illustrated in FIG. 5, and the method of applying the transparent bead material 31 or the cover coating agent is not limited to the illustrated one, either. Any of various known methods is usable.

When the second-type bead-coated sheet is to be prepared by the above process, the sheet including the cover coat layer 36 and delivered from the drying unit 37 is further coated with a top coat layer, dried for curing and then fed to the pinch rollers 38.

The materials for producing bead-coated sheets by the above process of the invention will be described briefly.

The release sheet can be a known one which is used widely.

The hot-melt adhesive can be any of those known and transparent, including polyamide, polyester, epoxy and thermoplastic elastomeric adhesives.

Useful flexible sheet substrates are those having resistance to water, weather, corrosion and the like, bearing a print of pattern or colored when required, and pretreated for adhesion as desired. Such substrates are made of a fabric or nonwoven fabric knitted, woven or otherwise formed of natural, chemical or synthetic fiber such as cotton, hemp, nylon, rayon, polyester or acrylic, leather, or the like.

Suitable transparent beads, cover coating agents and top coating agents are those already mentioned for the bead-coated sheets of the first and second types.

While the process of the invention has been described with reference to the above embodiment, other exemplary processes are given below for further reference.

(i) A process comprising mixing beads with a melt of hot-melt adhesive, applying the mixture to a release sheet, separating the release sheet off after drying the mixture to obtain a bead-adhesive sheet, and bonding the sheet to cloth or fabric as superposed thereon by application of heat and pressure.

(ii) A process comprising coating a release sheet with a melt of hot-melt adhesive to form a filmlike adhesive layer thereon, sprinkling beads over the layer, partly sinking the beads in the adhesive layer and bonding the beads thereto by application of heat and pressure, removing the release sheet from the layer to obtain a bead-adhesive sheet, and bonding the resulting sheet to cloth or fabric as superposed thereon by application of heat and pressure.

(iii) A process comprising forming a hot-melt adhesive into a film by suitable means, bonding beads to the film with an adhesive to obtain a bead-adhesive sheet, and bonding the sheet to cloth or fabric as superposed (iv) A process wherein the surface of the bead layer obtained by any one of processes (i) to (iii) is covered with a transparent cover coat.

What is claimed is:

1. A decorative, ornamental bead-coated sheet that is durable, flexible and easy to handle and which may be readily affixed to the surfaces of less flexible more rigid sheet material, said bead-coated sheet comprising:
   a. a flexible sheet substrate;
   b. a layer of a flexible aqueous emulsion resin adhesive coated on one surface of said flexible sheet substrate;
   c. a layer of transparent beads formed from a plurality of individual beads treated with a silane coupling agent and embedded into said layer of adhesive so that a portion of each of said beads projects outwardly from the surface of said adhesive, and
   d. a flexible transparent cover coat overlaying said layer of beads to conform to the surface projections of said beads without obscuring said surface projections so that the surface of said finished sheet has a configuration corresponding to the surface projections of said beads.

2. A bead-coated sheet as described in claim 1, wherein said flexible sheet substrate is selected from the group consisting of synthetic resin films, natural and synthetic fiber woven and knitted fabrics, natural and synthetic nonwoven fabrics, leather, paper and metal foil.

3. A bead-coated sheet as described in claim 2, wherein said flexible sheet substrate is a synthetic resin film selected from the group consisting of polyvinyl chloride, polyester, acrylic and polycarbonate films.

4. A bead-coated sheet as described in claim 2, wherein said beads are formed of a material selected from the group consisting of glass and plastic.

5. A bead-coated sheet as described in claim 4, wherein said sheet further includes a layer of pressure-sensitive adhesive covering the opposite surface of said flexible sheet substrate from said aqueous emulsion type resin adhesive and a sheet of a release material covering said layer of pressure sensitive adhesive.

6. A bead-coated sheet as described in claim 1, wherein said aqueous emulsion type resin adhesive is selected from the group consisting of shrinkage-free epoxy resin, vinyl acetate and acrylic acid esters.

7. A bead-coated sheet as described in claim 6, wherein said transparent cover coat and said adhesive are formed of the same material.

8. A decorative, ornamental bead-coated sheet that is flexible, durable and easily affixed to the surfaces of less flexible, more rigid sheet material comprising a flexible sheet substrate formed from highly damping elastic sheet material; a layer of a flexible, low shrinkable aqueous emulsion resin adhesive covering said flexible sheet; a layer of beads selected from the group consisting of transparent glass beads and transparent plastic beads and coated with a silane coupling agent embedded into said layer of adhesive so that portions of the beads project from the surface of the adhesive; a flexible transparent thin cover layer overlaying said layer of beads so that said cover layer conforms to the surface configuration of said bead layer; and a transparent top coat having a lower hardness than said bead layer covering said cover layer without obscuring the surface projections of said bead layer.

9. A bead-coated sheet as described in claim 8, wherein said flexible sheet substrate is formed of a highly damping elastic material selected from the group consisting of rubber sheets, natural and synthetic foamed sheets, natural and synthetic woven and nonwoven fabrics and leather.

10. A bead-covered sheet as described in claim 9, wherein said fabric is selected from the group consisting of cotton, hemp, rayon, nylon, polyester and acrylic fibers.

11. A bead-coated sheet as described in claim 8, wherein said top coat is formed of a transparent resin selected from the group consisting of elastic silicone resin, soft polyurethane resin and soft epoxy resin having a JIS A hardness of 10 to 50.

12. A bead-coated sheet as described in claim 11, wherein said transparent resin has a JIS A hardness of 15 to 40.

13. A bead-coated sheet as described in claim 11, wherein said cover layer and said top coat are made of the same material.

14. A bead-coated sheet as described in claim 8, wherein said adhesive layer and said cover layer are made from a flexible, low-shrinkage material that is curable at low temperatures selected from the group consisting of urethane, acrylic, epoxy, silicone and fluorine-containing resins and rubber.

15. A bead-coated sheet as described in claim 14, wherein said adhesive layer and said cover layer comprises a material selected from the group consisting of epoxy resin, vinyl acetate and acrylic acid esters.

16. A bead-coated sheet as described in claim 14, wherein said adhesive layer and said cover layer are formed of a synthetic resin curable with ultraviolet rays.

17. A bead-coated sheet as described in claim 8, wherein said sheet further includes a layer of pressure sensitive adhesive covering the opposite surface of said flexible sheet substrate from said aqueous emulsion type resin adhesive and a sheet of a release material covering said layer of pressure sensitive adhesive.

* * * * *